(12) United States Patent
Li et al.

(10) Patent No.: US 11,354,295 B2
(45) Date of Patent: Jun. 7, 2022

(54) SELF-HEALING REAL-TIME DATA PROCESSING

(71) Applicant: PAYPAL, INC., San Jose, CA (US)

(72) Inventors: Xin Li, Shanghai (CN); Xiaohan Yun, Palo Alto, CA (US); Yunfeng Li, Golden, CO (US); Yang Yu, Shanghai (CN); Zhijun Ling, Shanghai (CN); Ke Zheng, Shanghai (CN); Uri Arad, Herzliya (IL); Frederic Tu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 86 days.

(21) Appl. No.: 15/553,952

(22) PCT Filed: Aug. 18, 2017

(86) PCT No.: PCT/CN2017/098075
§ 371 (c)(1),
(2) Date: Aug. 28, 2018

(87) PCT Pub. No.: WO2019/033397
PCT Pub. Date: Feb. 21, 2019

(65) Prior Publication Data
US 2019/0197030 A1    Jun. 27, 2019

(51) Int. Cl.
*G06F 16/23* (2019.01)
*G06F 16/2458* (2019.01)
(Continued)

(52) U.S. Cl.
CPC ...... *G06F 16/2322* (2019.01); *G06F 16/2358* (2019.01); *G06F 16/2365* (2019.01);
(Continued)

(58) Field of Classification Search
CPC ............ G06F 16/2322; G06F 16/2379; G06F 16/2477; G06F 16/2365; G06F 16/2372;
(Continued)

(56) References Cited

U.S. PATENT DOCUMENTS

| | | | | |
|---|---|---|---|---|
| 5,212,789 A | * | 5/1993 | Rago | G06F 16/2379 |
| 6,832,187 B1 | * | 12/2004 | Dow | G06F 21/608 |
| | | | | 358/1.11 |

(Continued)

FOREIGN PATENT DOCUMENTS

| | | |
|---|---|---|
| CN | 102682399 | 9/2012 |
| CN | 104239019 | 12/2014 |
| WO | WO 2014/204489 A2 | 12/2017 |

OTHER PUBLICATIONS

Abadi, Daniel J et al., "The Design of the Borealis Stream Processing Engine" CIDR 2005, Second Biennial Conference on Innovative Data Systems Research, Asilomar, Ca, USA, dated Jan. 4, 2005, pp. 277-289.

*Primary Examiner* — Neveen Abel Jalil
*Assistant Examiner* — Hubert Cheung
(74) *Attorney, Agent, or Firm* — Haynes and Boone, LLP (57) ABSTRACT

Methods and systems for processing incoming data in real-time are described herein. The incoming data is processed in real-time to generate data records that may be improved over time, for example, by automatically correcting inaccurate data in the records. In some embodiments, when data is received, a real-time process is initially performed on the received data under a first time constraint to produce first data for a data record. Subsequently, one or more non-real-time processes are then performed on the received data under a second time constraint to produce second data for the data record. The second data may be used to update the data record, for example, to correct any inaccuracy caused (Continued)

by the real-time process of the received data. Preferably, the second time constraint is longer than the first time constraint.

20 Claims, 6 Drawing Sheets (51) Int. Cl.
*G06F 16/00* (2019.01)
*G06F 16/18* (2019.01)

(52) U.S. Cl.
CPC ...... *G06F 16/2372* (2019.01); *G06F 16/2379* (2019.01); *G06F 16/2477* (2019.01); *G06F 16/00* (2019.01); *G06F 16/1865* (2019.01)

(58) Field of Classification Search
CPC .. G06F 16/2358; G06F 16/00; G06F 16/1865; G06Q 20/08–20; G06Q 20/38; G06Q 30/04; G06Q 40/00; G06Q 40/12
See application file for complete search history.

(56) References Cited

U.S. PATENT DOCUMENTS

| | | | | |
|---|---|---|---|---|
| 8,676,851 B1* | 3/2014 | Nesbit | ................ | G06F 16/1774 707/791 |
| 10,452,641 B1* | 10/2019 | Batchu | ................ | G06F 16/2365 |
| 10,515,063 B1* | 12/2019 | Burtsev | .............. | G06F 16/2358 |
| 10,768,920 B2* | 9/2020 | Fontoura | .................. | G06F 8/65 |
| 2002/0107777 A1* | 8/2002 | Lane | .................... | G06Q 10/087 705/37 |
| 2003/0055807 A1* | 3/2003 | Lomet | ................ | G06F 16/2322 |
| 2004/0236746 A1* | 11/2004 | Lomet | ................ | G06F 16/2322 |
| 2005/0234918 A1* | 10/2005 | Brunnabend | ....... | G06F 11/1474 |
| 2007/0050400 A1* | 3/2007 | Durbin | .................. | G06F 16/221 |
| 2007/0130215 A1* | 6/2007 | Klein | ................ | G06F 16/2379 |
| 2009/0144221 A1* | 6/2009 | Berk | ................... | G06F 16/2477 |
| 2009/0271529 A1* | 10/2009 | Kashiyama | ......... | G06F 16/2455 710/1 |
| 2013/0066866 A1* | 3/2013 | Chan | .................... | G06F 16/335 707/732 |
| 2014/0143373 A1* | 5/2014 | Vitaly | .................... | H04L 65/10 709/217 |
| 2014/0297595 A1* | 10/2014 | Larson | ................... | G06F 9/466 707/648 |
| 2015/0046744 A1* | 2/2015 | Frerking | ............ | G06F 11/3055 714/4.11 |
| 2015/0082197 A1* | 3/2015 | Pearl | ...................... | G06F 3/048 715/753 |
| 2015/0242247 A1* | 8/2015 | Chessell | ................ | G06F 9/526 710/200 |
| 2015/0347540 A1* | 12/2015 | Singh | .................. | G06F 16/2365 707/602 |
| 2017/0075721 A1 | 3/2017 | Bishop et al. | | |
| 2017/0075943 A1* | 3/2017 | Heidel | ............... | G06F 16/2358 |
| 2018/0075078 A1* | 3/2018 | Dandy | ................ | G06F 16/2358 |
| 2019/0034470 A1* | 1/2019 | Grabham | ................ | G06F 9/466 |

* cited by examiner

| 402 | Slot index | ... | 11:00-12:00 | 12:00-13:00 | 13:00-14:00 | ... |
|---|---|---|---|---|---|---|
| | Value | ... | 2 | 0 | 0 | ... |

Figure 4A

| 402 | Slot index | ... | 11:00-12:00 | 12:00-13:00 | 13:00-14:00 | ... |
|---|---|---|---|---|---|---|
| | Value | ... | 2 | 1 | 0 | ... |

Figure 4B

| 402 | Slot index | ... | 11:00-12:00 | 12:00-13:00 | 13:00-14:00 | ... |
|---|---|---|---|---|---|---|
| | Value | ... | 2 | 2 | 0 | ... |

Figure 4C

| 402 | Slot index | ... | 11:00-12:00 | 12:00-13:00 | 13:00-14:00 | ... |
|---|---|---|---|---|---|---|
| | Value | ... | 2 | 3 | 0 | ... |

SELF-HEALING REAL-TIME DATA PROCESSING

CROSS-REFERENCE TO RELATED APPLICATIONS

This application claims priority to and the benefit of International Patent Application No. PCT/CN2017/098075, filed on Aug. 18, 2017, the contents of which are hereby incorporated by reference herein in its entirety.

BACKGROUND

The present specification generally relates to real-time processing of data to generate data records for storage, and more specifically to providing a processing mechanism that automatically corrects inaccuracies in data records, in various embodiments.

RELATED ART

Enterprise servers are often required to process data related to hundreds of millions of events (e.g., login attempts, payment transactions, etc.) each day. The event data is often required to be processed in real-time (e.g., with a short latency requirement, such as less than one second) such that the servers can operate and/or react by relying on data that accurately represents the current condition. Due to stringent timing requirements, high processing load, and a variety of other reasons, such as data packet drops, unstable database performance for real time processing, data writing conflicts that could not be resolved within a short latency requirement, data corruption, etc., it is common that a typical enterprise server would fail to process one or more events in real-time, and as a result, quality of the resulting data records suffer. To further exacerbate the problem, if a real-time processing application of the enterprise server crashes or the data storage runs out of memory while processing the event data in real-time, a portion of the data might be lost and become unrecoverable. Thus, there is a need for improved real-time data processing systems and methods.

SUMMARY

The present disclosure describes methods and systems for processing incoming data in real-time to generate data records and automatically improving the quality of the generated data records over time. In some embodiments, when data is received, a real-time process is initially performed on the received data under a first time constraint to produce first data for a data record. Subsequently, one or more non-real-time processes may then be performed on the received data under a second time constraint to produce second data for the data record. The second data may be used to update the data record, for example, to correct any inaccuracy caused by the real-time process of the received data. In various instances, the second time constraint is longer (e.g. more relaxed) than the first time constraint.

Data for real-time processing may be any type of data, including event data associated with one or more events. Examples of event data that may require an enterprise server to process in real-time include log-in attempt data and transaction data such as payment transaction data. These types of data may require real-time processing because of their time-sensitive nature, as subsequent actions performed by the enterprise server may depend on the previously occurred events. Note that "real-time" processing may generally refer, in various embodiments, to rapid processing of data to meet a service level agreement (SLA) or other specified short-term time constraint, which may be on the order of milliseconds, or seconds (e.g. 1, 5, 10) in various embodiments.

According to various embodiments of the disclosure, data generated by processing received event data may be stored in a data structure that enables the non-real-time process to correct any data inaccuracies in the generated data. An example of such a data structure is a sliding window data structure. A sliding window data structure includes one or more data buckets. Each data bucket includes multiple slots, where each slot corresponds to a distinct time frame. In some of these embodiments, the received event data associated with the one or more events includes timestamps that indicate when the one or more events occurred. When the event data is received, the real-time process according to various embodiments of the disclosure derive a data value from the event data and update the data in a slot corresponding to the timestamp of the event data. Since the real-time process has to process the event data under a tight time constraint, the slot that is being updated usually corresponds a time frame including a current time. The tight time constraint under which the real-time process has to process the event data may cause inaccurate data being written (or updated) into the slot.

As such, the same event data may also be processed by one or more non-real-time processes under a more relaxed (longer) time constraint. In some embodiments, the one or more non-real-time processes perform substantially identical operations as the real-time process. Due to the longer time constraint, the data generated by a non-real-time process processing the event data has a higher quality than the data generated by the real-time process in various embodiments. In some embodiments, the data generated by the non-real-time process may be used to update (e.g. correct) the data values in the corresponding slots in the sliding window data structure. In some embodiments, the non-real-time process may wait until the data value in a slot is matured before updating and/or correcting the data value in the slot. The data value in the slot is matured when the data value is no longer updatable by the real-time process because the corresponding time frame of the slot is beyond the tight time constraint with respect to the current time. Therefore, the non-real-time process that updates and/or corrects the data values ensures that even though the initial data values generated by the real-time process may not be accurate, the inaccuracies are corrected by the non-real-time process. Thus, the quality of the data records is improved over time.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for processing incoming data in real-time to generate data records and automatically improving the quality of the generated data records over time. As mentioned above, when processing a large volume of data in real-time with a short latency requirement, the quality of the resulting data records may suffer due to various technical shortcomings. The disclosed methods and systems provide a self-correction mechanism that automatically improves the quality of the resulting data records over time, for example, by automatically correcting inaccurate data in the records, without impeding the operations of the real-time data processing. Thus, the disclosed methods and systems advantageously improve the quality of the resulting data records without reducing the performance of the real-time processing operations on incoming data.

In some embodiments, when data (e.g., event data) is received, a real-time process is initially performed on the received data under a first time constraint (e.g., one second, several seconds, etc.) to produce first data for a data record. Subsequently, one or more non-real-time processes may then be performed on the received data under a second time constraint (e.g., five minutes, fifteen minutes, etc.) to produce second data for the data record. The second data may be used to update the data record, for example, to correct any inaccuracy caused by the real-time process of the received data. In various instances, the second time constraint is longer (e.g. more relaxed) than the first time constraint.

Data for real-time processing may be any type of data, including event data associated with one or more events. Examples of event data that may require an enterprise server to process in real-time include data associated with transactional actions related to (e.g., performed on) one or more user accounts such as data associated with a login attempt with a user account, data associated with a payment transaction with a user account, data associated with a fund transfer transaction with a user account, data associated with a purchase of a good or service using a user account. These types of data may require real-time processing (e.g., require extremely short latency such as seconds or milliseconds, etc.) because of their time-sensitive nature, as subsequent actions performed by the enterprise server may depend on the previously occurred events (e.g., an event that occurred a second or a few seconds prior to the subsequent action). Note that "real-time" processing may generally refer, in various embodiments, to rapid processing of data to meet a service level agreement (SLA) or other specified short-term time constraint, which may be on the order of milliseconds, or seconds (e.g. 1, 5, 10) in various embodiments. For example, the enterprise server may implement a policy of locking a user account after five consecutive failed log-in attempts. In this example, whether to grant access to the user account may depend on how many consecutive failed log-in attempts have occurred prior to the present log-in attempt.

According to various embodiments of the disclosure, data generated by processing received event data may be stored in a data structure that enables the non-real-time process to correct any data inaccuracies in the generated data. An example of such a data structure is a sliding window data structure. A sliding window data structure includes one or more data buckets. Each data bucket includes multiple slots, where each slot corresponds to a distinct time frame. In some of these embodiments, the received event data associated with the one or more events includes timestamps that indicate when the one or more events occurred. When the event data is received, the real-time process according to various embodiments of the disclosure derive a data value from the event data and update the data in a slot corresponding to the timestamp of the event data. In some embodiments, updating may include replacing an existing data in the slot with the derived data value. In other embodiments, updating the data may include creating a new data record for the received event data and inserting the derived data value in a slot of the newly created data record. Since the real-time process has to process the event data under a tight time constraint (e.g., within seconds), the slot that is being updated usually corresponds a time frame including a current time. As discussed above, the tight time constraint under which the real-time process has to process the event data may cause inaccurate data being written (or updated) into the slot. For example, some event data may fail to be processed and/or data may fail to be updated in the slots because of insufficient processing power to process the large volume of event data within the tight time constraint, data writing conflicts that could not be resolved within the tight time constraint, data storage instability, data corruption, or any other technical shortcoming.

As such, it has been contemplated that the same event data may also be processed by one or more non-real-time processes under a more relaxed (longer) time constraint. In some embodiments, the one or more non-real-time processes perform substantially identical operations as the real-time process. Due to the longer time constraint, the data generated by a non-real-time process processing the event data in various embodiments has a higher quality (e.g., more accurate) than the data generated by the real-time process. In some embodiments, the data generated by the non-real-time process may be used to update (e.g., correct) the data values in the corresponding slots in the sliding window data structure. In some embodiments, the non-real-time process may wait until the data value in a slot is matured before updating and/or correcting the data value in the slot. The data value in the slot is matured when the data value is no longer updatable by the real-time process because the corresponding time frame of the slot is beyond the tight time constraint with respect to the current time. Therefore, the non-real-time process that updates and/or corrects the data values ensures that even though the initial data values generated by the real-time process may not be accurate, the inaccuracies are corrected by the non-real-time process. Thus, the quality of the data records is improved over time.

Figure 1:
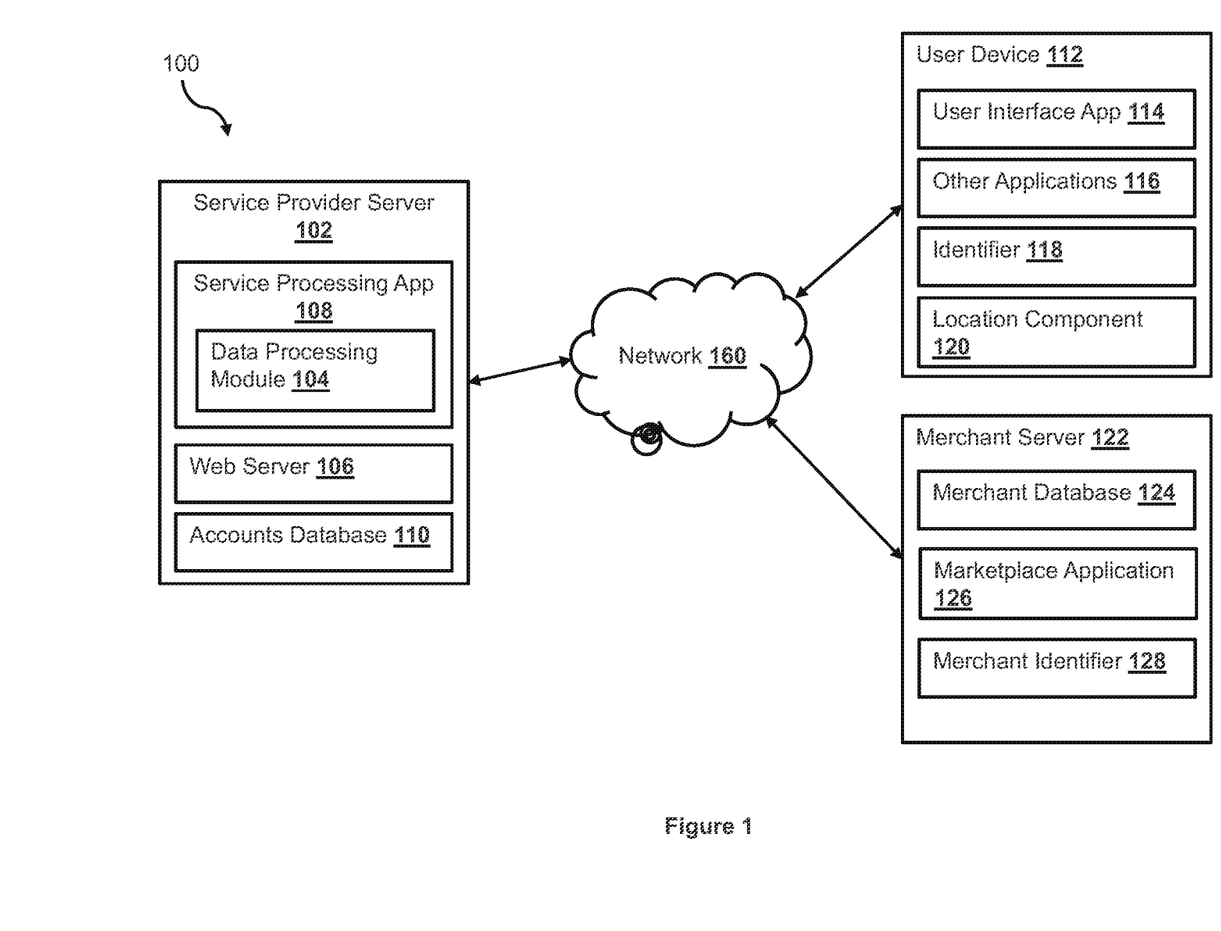
FIG. 1 is a block diagram illustrating a system for self-correcting data records generated from real-time processing of incoming data according to an embodiment of the present disclosure.

FIG. 1 shows one embodiment of a block diagram of a network-based system 100 adapted to perform self-correction of data records generated by real-time processing of data (e.g., event data) received over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 112 (e.g., a smartphone, a desktop computer, a laptop computer, a tablet, etc.), a merchant server 122, and a service provider server 102 (e.g., a network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by a user to interact with the merchant server 122 and/or the service provider server 102 over the network 160. For example, the user may use the user device 112 to log in to a user account to conduct account services or conduct financial transactions (e.g., account transfers or payments) with the service provider server 102. Similarly, a merchant associated with the merchant server 122 may use the merchant server 122 to log in to a merchant account to conduct account services or conduct financial transactions (e.g., payment transactions) with the service provider server 102. The user device 112, in various embodiments, may be implemented using any appropriate combination of hardware and/or software configured for wired and/or wireless communication over the network 160. In various implementations, the user device 112 may include at least one of a wireless cellular phone, wearable computing device, PC, laptop, etc.

The user device 112, in one embodiment, includes a user interface application 114, which may be utilized by the user to conduct transactions (e.g., shopping, purchasing, bidding, etc.) with the service provider server 102 over the network 160. In one aspect, purchase expenses may be directly and/or automatically debited from an account related to the user via the user interface application 114.

In one implementation, the user interface application 114 includes a software program, such as a graphical user interface (GUI), executable by a processor that is configured to interface and communicate with the service provider server 102 via the network 160. In another implementation, the user interface application 114 includes a browser module that provides a network interface to browse information available over the network 160. For example, the user interface application 114 may be implemented, in part, as a web browser to view information available over the network 160.

The user device 112, in various embodiments, may include other applications 116 as may be desired in one or more embodiments of the present disclosure to provide additional features available to the user. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 114 for improved efficiency and convenience.

The user device 112, in one embodiment, may include at least one user identifier 118, which may be implemented, for example, as operating system registry entries, cookies associated with the user interface application 114, identifiers associated with hardware of the user device 112 (e.g., a media control access (MAC) address), or various other appropriate identifiers. The user identifier 118 may include one or more attributes related to the user of the user device 112, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 118 may be passed with a user login request to the service provider server 102 via the network 160, and the user identifier 118 may be used by the service provider server 102 to associate the user with a particular user account maintained by the service provider server 102.

In various implementations, the user is able to input data and information into an input component (e.g., a keyboard) of the user device 112 to provide user information with a transaction request, such as a fund transfer request. The user information may include user identification information.

User device 112, in various embodiments, include a location component 120 configured to determine, track, monitor, and/or provide an instant geographical location of user device 112. In one implementation, the geographical location may include GPS coordinates, zip-code information, area-code information, street address information, and/or various other generally known types of location information. In one example, the location information may be directly entered into user device 112 by the user via a user input component, such as a keyboard, touch display, and/or voice recognition microphone. In another example, the location information may be automatically obtained and/or provided by the user device 112 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using user device 112 via a check-in device at a location, such as a beacon. This helps to save battery life and to allow for better indoor location where GPS typically does not work.

Even though only one user device 112 is shown in FIG. 1, it has been contemplated that one or more user devices (each similar to user device 112) may be communicatively coupled with the service provider server 102 via the network 160 within the system 100.

The merchant servers 122, in various embodiments, may be maintained by a business entity (or in some cases, by a partner of a business entity that processes transactions on behalf of business entity). Examples of businesses entities include merchant sites, resource information sites, utility sites, real estate management sites, social networking sites, etc., which offer various items for purchase and process payments for the purchases. The merchant server 122 may include a merchant database 124 for identifying available items, which may be made available to the user device 112 for viewing and purchase by the user.

The merchant server 122, in one embodiment, may include a marketplace application 126, which may be configured to provide information over the network 160 to the user interface application 114 of the user device 112. For example, the user of the user device 112 may interact with the marketplace application 124 through the user interface application 114 over the network 160 to search and view various items available for purchase in the merchant database 124.

The merchant server 122, in one embodiment, may include at least one merchant identifier 128, which may be included as part of the one or more items made available for purchase so that, e.g., particular items are associated with the particular merchants. In one implementation, the merchant identifier 128 may include one or more attributes and/or parameters related to the merchant, such as business and banking information. The merchant identifier 286 may include attributes related to the merchant server 122, such as identification information (e.g., a serial number, a location address, GPS coordinates, a network identification number, etc.).

A merchant may also use the merchant server 122 to communicate with the service provider server 102 over network 160. For example, the merchant may use the merchant server 122 to communicate with the service provider server 102 in the course of various services offered by the service provider to a merchant, such as payment intermediary between customers of the merchant and the merchant itself. For example, the merchant server 122 may use an application programming interface (API) that allows it to offer sale of goods in which customers are allowed to make payment through the service provider server 102, while the user may have an account with the service provider server that allows the user to use the service provider server 102 for making payments to merchants that allow use of authentication, authorization, and payment services of the service provider as a payment intermediary. The merchant may also have an account with the service provider server 102. Even though only one merchant server 122 is shown in FIG. 1, it has been contemplated that one or more merchant servers (each similar to merchant server 122) may be communicatively coupled with the service provider server 102 via the network 160 in the system 100.

The service provider server 102, in one embodiment, may be maintained by a transaction processing entity or an online service provider, which may provide processing for financial transactions and/or information transactions between the user of user device 112 and one or more merchants. As such, the service provider server 102 includes a service application 108, which may be adapted to interact with the user device 112 and/or the merchant server 122 over the network 160 to facilitate the searching, selection, purchase, and/or payment of items by the users from one or more merchants. In one example, the service provider server 102 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 108, in one embodiment, may include a payment processing application (not shown) for processing purchases and/or payments for financial transactions between a user and a merchant. In one implementation, the payment processing application assists with resolving financial transactions through validation, delivery, and settlement. As such, the service application 108 in conjunction with the payment processing application settles indebtedness between a user and a merchant, wherein accounts may be directly and/or automatically debited and/or credited of monetary funds in a manner as accepted by the banking industry.

In various embodiments, the service processing application 108 also includes a data processing module 104 for processing incoming data received via the network 160. As discussed above, in the course of providing services to users and merchants, incoming data may be received at the service provider server 102. The incoming data may include event data associated with one or more events. For example, when a user logins (or attempts to login) to a user account via the user device 112 over the network 160, event data associated with the login event is received at the service provider server 102. In another example, a merchant may use the merchant server 122 to request for a payment to be processed, and event data associated with the payment process request is received at the service provider server 102. The incoming data may be serialized to form a stream of data to be processed by the service provider server 102. The data processing module 104 is configured to then process the incoming data using the techniques described herein according to various embodiments of the disclosure. While the data processing module 104 is shown to be included within the service processing app 108, it has been contemplated that a portion of or the entire data processing module 104 may alternatively be implemented as a stand-alone component outside of the service processing app 108.

The service provider server 102, in one embodiment, may be configured to maintain one or more user accounts and merchant accounts in an account database 110, each of which may include account information associated with one or more individual users (e.g., the user associated with user device 112) and merchants. For example, account information may include private financial information of users and merchants, such as one or more account numbers, passwords, credit card information, banking information, digital wallets used, or other types of financial information, which may be used to facilitate financial transactions between the users and merchants. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 102, and the user may have credentials to authenticate or verify identity with the service provider server 102. User attributes may include personal information, banking information and/or funding sources. In various aspects, the user attributes may be passed to the service provider server 102 as part of a login, search, selection, purchase, and/or payment request, and the user attributes may be utilized by the service provider server 102 to associate the user with one or more particular user accounts maintained by the service provider server 102.

Figure 2:
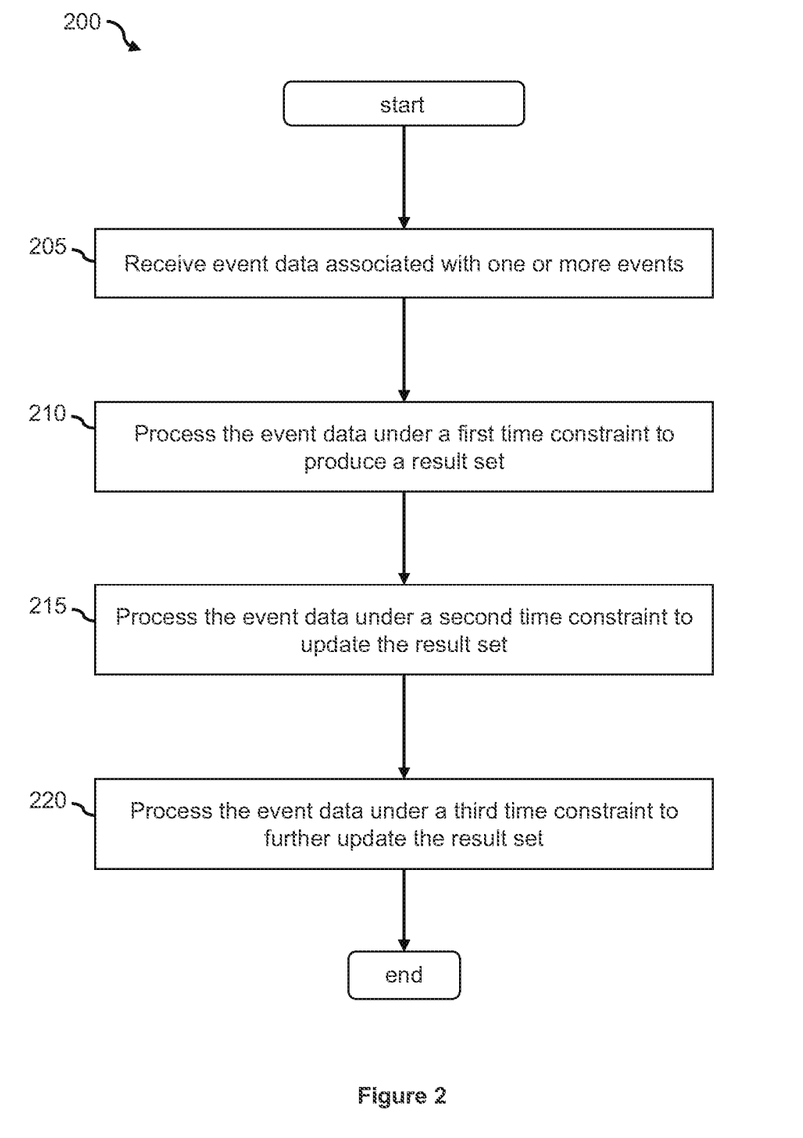
FIG. 2 is a flowchart showing a method for self-correcting data records generated from real-time processing of incoming data according to an embodiment of the present disclosure.

Referring now to FIG. 2, a process 200 for processing data is illustrated according to an embodiment of the disclosure. In some embodiments, the process 200 may be performed by the data processing module 104. As discussed above, in the course of providing services to users and merchants, or any other entities that may interact with the service provider server 102, the service provider server 102 may continuously receive incoming data (in block 205) from the user device 112, the merchant device 122, and/or any other devices that communicate with the service provider server 102 via the network 160. The incoming data may include event data associated with one or more events, such as transactional actions related to a user account. For example, when a user logins (or attempts to login) to a user account via the user device 112 over the network 160, event data associated with the login event is received at the service provider server 102. In another example, a merchant may use the merchant server 122 to request for a payment to be processed, and event data associated with the payment process request is received at the service provider server 102.

The incoming data from the various devices may be transmitted to the service provider server 102 at different times. The incoming data may already include a timestamp that indicates when the associated event occurs. Alternatively, if the incoming data does not have timestamp information, the service provider server 102 may be configured to append a timestamp indicating a time when the associated event occurs to the data. Furthermore, as data associated with different events may be received continuously over time, the incoming data may be serialized, for example, by the service provider server 102, to form a stream of serialized data to be processed.

Figure 3:
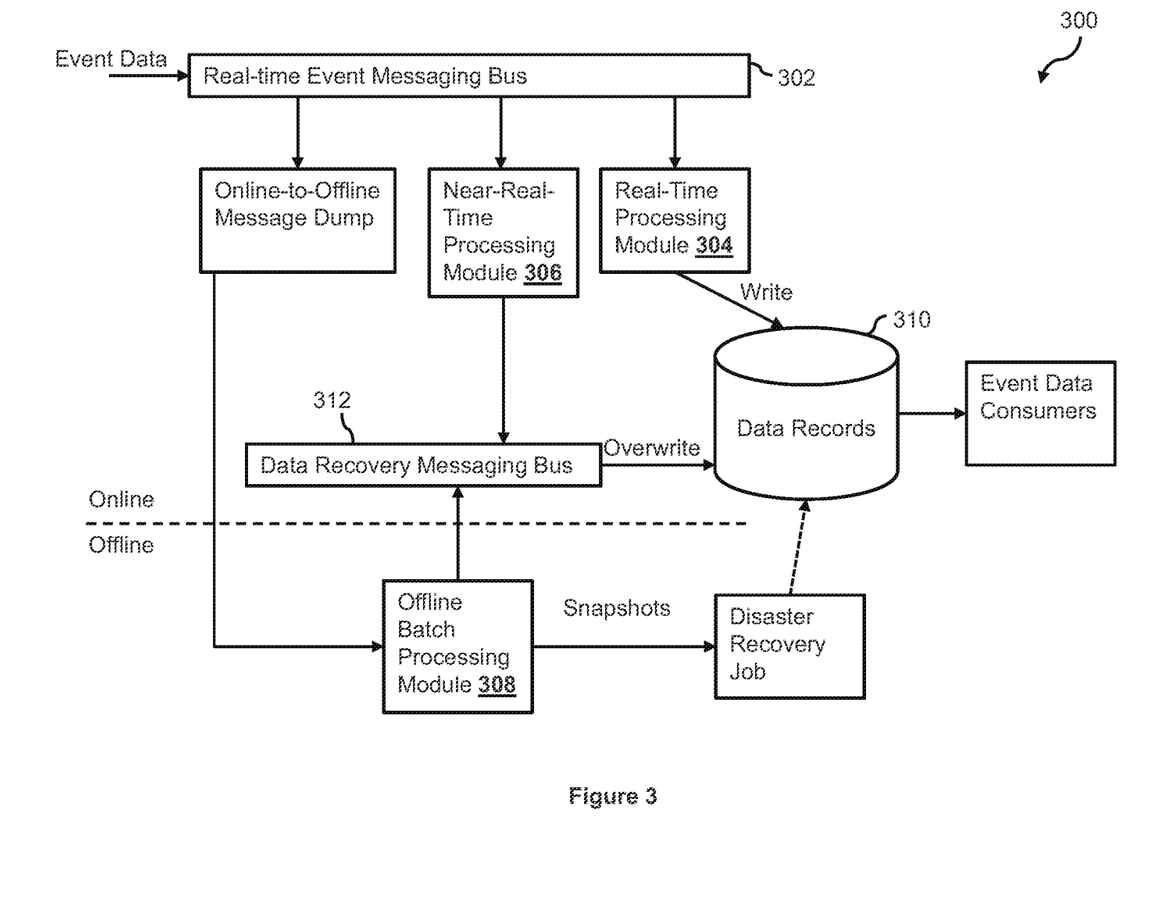
FIG. 3 illustrates an example data flow of a system for performing self-correction of data records generated by real-time processing of incoming data according to an embodiments of the present disclosure.

Referring to FIG. 3, which is a block diagram of a system 300 for processing event data. The system 300 may be implemented by the data processing module 104 of the service provider server 102. As shown, event data associated with one or more events from one or more devices over a network may be serialized into a stream of event data and distributed to various processes by a real-time event messaging bus 302. Via the real-time event messaging bus, the event data may be distributed to different processing modules (such as real-time processing module 304, near-real-time processing module 306, and offline batch processing module 306) for processing the event data. For example, the real-time processing module 304 may process (in block 210) the event data under a first time constraint. In some embodiments, the first time constraint is a tight constraint that provides a small time window (e.g., a second, several seconds, etc.) within which to process the event data. In some embodiments, due to the first time constraint, the real-time processing module 304 may first determine whether the received event data has expired under the first time constraint (e.g., a time period indicated by the first time constraint has passed based on a determined current time from a time indicated by the timestamp of the event data). In other words, the real-time processing module 304 determines whether it is too late for the real-time processing module 304 to process the event data. If it is determined that the event data has expired, the real-time processing module 304 may disregard the event data, and move on to process subsequent event data. On the other hand, if it is determined that the event data has not expired, the real-time processing module 304 may process the event data as described herein.

According to various embodiments of the disclosure, processing the event data related to an event may include generating data for a data record associated with the event and updating the data record with the generated data. In some embodiments, updating the data record may include determining if a data record associated with the event exists in the database 310. If such a data record exists in the database 310, the data record may be retrieved and updated. If such a data record does not exist, a new data record may be created for the event, and the generated data may be inserted in the newly created data record. For example, the event may include a log-in attempt for a particular user account. In this example, the real-time processing module 304 may perform at least an operation of generating an updated value for the data record that keeps track of the number of log-in attempts for the particular user account, for example, by incrementing the existing value by one. In another example where the event data is related to a payment transaction event, the real-time process 304 may perform the operations of crediting an amount to an account of a receiver (adding the amount to an existing amount in a data record associated with the account of the receiver), debiting the amount from an account of a giver (subtracting the amount from an existing amount in a data record associated with the account of the giver), incrementing an existing value of a data record representing a number of transactions for the receiver by one, and/or incrementing an existing value of a data record representing a number of transactions for the giver by one. Different data operations may be performed by the real-time processing module 304 for event data associated with different events or event types.

As discussed above, a specific data structure as metadata for the data record may be used in order to implement the self-correcting mechanism for processing event data. One example data structure that can used to enable the self-correcting mechanism is a sliding window data structure. A sliding window data structure may include one or more data buckets. Each bucket includes multiple data slots and corresponds to a different time granularity. For example, the data record for tracking the number of log-in attempts for the particular user account may include three data buckets—an hourly data bucket, a daily data bucket, and a yearly data bucket. The hourly data bucket may include sixty slots, each slot representing a distinct minute interval within an hour. The daily data bucket may include twenty-four slots, each slot representing a distinct hour interval within a day. The yearly data bucket may include three hundred and sixty-five slots, each representing a distinct day interval within a year. The data value within each slot in a data bucket represents the value generated from the one or more events that occur within the corresponding time interval. As shown in FIG. 3, the data records are stored in data storage 310. The data storage 310 may be implemented using one of many types of database (e.g., Oracle® database, Aerospike® database, etc.) that support the sliding window data structure. The data records stored in the data storage 310 may be accessed and/or consumed by other applications, such as the service processing app 108.

Figure 4A:
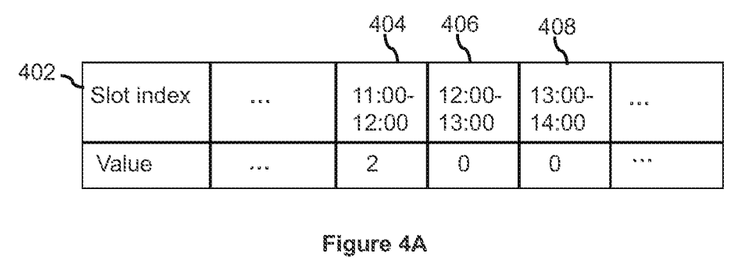
FIGS. 4A-4F illustrate snapshots of event data within a sliding window data structure at different time frames according to an embodiment of the present disclosure.

FIG. 4A illustrates a snapshot of an example daily bucket 402 for the log-in attempts data record. As shown, the daily bucket 402 includes many slots, such as slots 404, 406, and 408. Each slot represents a distinct hour within a day. For example, the slot 404 represents the "11:00-12:00" hour, the slot 406 represents the "12:00-13:00" hour, and the slot 408 represents the "13:00-14:00" hour, Specifically, FIG. 4A illustrates a snapshot of the daily bucket 402 at the time 11:59. As shown by the daily bucket 402, there have been two login attempts made for the user account within the hour 11:00-12:00. Since this is a snapshot of the bucket 402 at 11:59, the data values in slots 406 and 408, representing the hours of 12:00-13:00 and 13:00-14:00 are '0'.

As event data associated with one or more login events is received at the service provider server 102, the event data is distributed to the data processing module 104, and particularly to the real-time data processing module 304 via the real-time event messaging bus 302. The real-time processing module 304 is configured to then process the incoming event data and update the data record associated with login events of the user account. Particularly, the real-time processing module 304 according to various embodiments of the disclosure is configured to update the data buckets, including the daily bucket 402 of the login event data record.

Figure 4B:
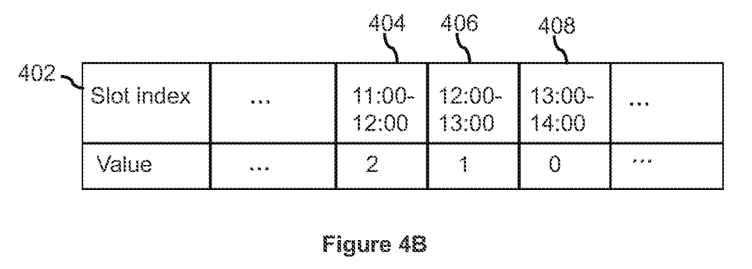

In a given example, event data related to four login attempts for the user account occur at 12:01, 12:10, 12:59, and 13:01, respectively, is received. In response to receiving the event data related to the 12:01 login attempt, the real-time processing module 304 is configured to update the data value in the slot 406, corresponding to the hour of 12:00-13:00. FIG. 4B illustrates a snapshot of the daily bucket 402 at 12:02, after the 12:01 login event has been processed by the real-time processing module 304. As shown, the data value in the slot 406 has been updated from '0' to '1' by the real-time processing module 304.

Figure 4C:
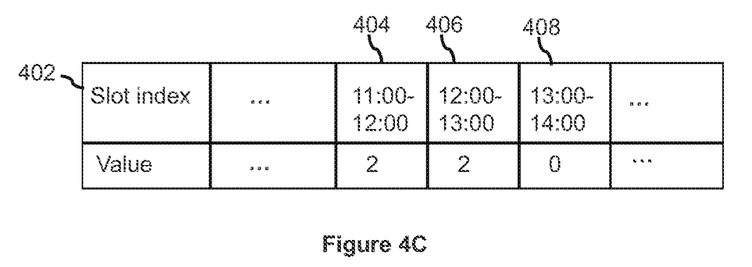

In response to receiving the event data related to the 12:10 login attempt, the real-time processing module 304 is configured to update the data value in the slot 406, corresponding to the hour of 12:00-13:00. FIG. 4C illustrates a snapshot of the daily bucket 402 at 12:11, after the 12:10 login event has been processed by the real-time processing module 304. As shown, the data value in the slot 406 has been updated from '1' to '2' by the real-time processing module 304.

Figure 4D:
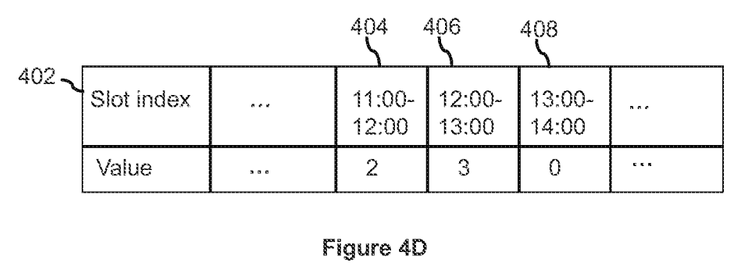

In response to receiving the event data related to the 12:59 login attempt, the real-time processing module 304 is configured to update the data value in the slot 406, corresponding to the hour of 12:00-13:00. FIG. 4D illustrates a snapshot of the daily bucket 402 at 13:00, after the 12:59 login event has been processed by the real-time processing module 304. As shown, the data value in the slot 406 has been updated from '2' to '3' by the real-time processing module 304.

Figure 4E:
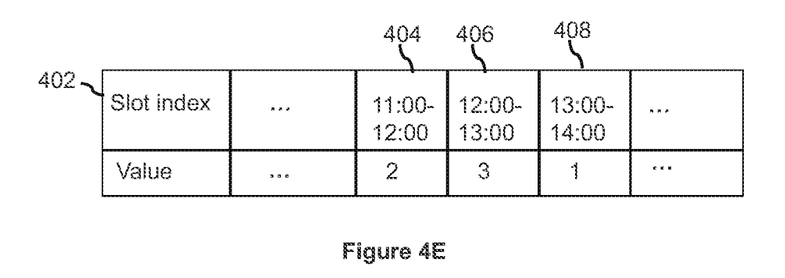

In response to receiving the event data related to the 13:01 login attempt, the real-time processing module 304 is configured to update the data value in the slot 408, corresponding to the hour of 13:00-14:00. FIG. 4E illustrates a snapshot of the daily bucket 402 at 13:02, after the 13:01 login event has been processed by the real-time processing module 304. As shown, the data value in the slot 408 has been updated from '0' to '1' by the real-time processing module 304. It is noted that even though only the daily bucket 402 is shown to be updated by the real-time processing module 304, the other buckets (e.g., the hourly bucket and the yearly bucket) corresponding to the login attempts data record may also be updated by the real-time processing module 304.

Referring back to FIG. 2, in addition to processing the event data under the first time constraint, in block, the event data is also distributed to a near-real-time processing module 306 for processing the event data under a second time constraint (in block 215). As discussed above, the second time constraint may be longer (e.g., more relaxed) than the first time constraint. For example, the latency requirement for processing event data by the near-real-time processing module 306 may be in minutes (e.g., 1 minute, 5 minutes, 15 minutes, etc.) instead of seconds. It is noted that due to the more relaxed time constraint, the data produced by the near-real-time processing module 306 may be more accurate (e.g., of higher quality) than the data produced by the real-time processing module 304. As such, the data produced by the near-real-time processing module 306 may be used by the data processing module 104 to update (e.g., overwrite) the data record, for example, to correct any data inaccuracy caused by the real-time processing module 304. In some embodiments, due to the second time constraint, the near-real-time processing module 306 may first determine whether the received event data has expired under the second time constraint (e.g., a time period indicated by the second time constraint has passed (based on a determined current time) from a time indicated by the timestamp of the event data). In other words, the near-real-time processing module 306 determines whether it is too late for the near-real-time processing module 306 to process the event data. If it is determined that the event data has expired, the near-real-time processing module 306 may disregard the event data, and move on to process subsequent event data. On the other hand, if it is determined that the event data has not expired, the near-real-time processing module 304 may process the event data as described herein.

According to an embodiment of the disclosure, the operation(s) that the near-real-time processing module 306 performs on the event data may be substantially identical to the operation(s) performed by the real-time processing module 304. In addition, the near-real-time processing module 306 may perform processing of the event data in parallel with the real-time processing module and access the same data records as the real-time processing module. Accordingly, the near-real-time processing module 306 may run in the background and update the data value of a slot only when the data value is matured to avoid updating the same slot at the same time as the real-time processing module 304. In some embodiments, determining whether the data value of a slot is matured is based on a current time, the time interval corresponding to the slot, and the first time constraint. The data value is matured when the real-time processing module 304 will no longer update the data value in the slot. In some embodiments, determining whether the data value of a slot is matured may be based on a current time and the time constraint of the other data processing module. For example, if the first time constraint associated with the real-time processing module 304 is five seconds, then the data value of a slot is matured for the near-real-time processing module 306 five seconds after the slot is expired (that is, when the current time is five seconds after the corresponding time interval of the slot has ended). Referring back to the daily bucket 402, the data value in the slot 404 is matured for the near-real-time processing module 306 five seconds after 12:00 on a given day.

In the example given above, the near-real-time processing module 306 may have completed processing the 12:01 and 12:10 login events at 12:30. However, since the real-time processing module 304 may still update the data value of the slot 406 based on potential events that occur between 12:30 and 13:00 (see FIG. 4C), the near-real-time processing module 306 may store a copy of the processed data (e.g., in a buffer or a temporary storage) and wait until the data value in the slot 406 is matured before updating the data value in the slot 406. On the other hand, since the data value in the slot 404 is already matured at 12:10, the near-real-time processing module 306 may compare the data value in the slot 404 with the data generated by the near-real-time processing module based on events that occur between 11:00 and 12:00, and replace (e.g., overwrite) the data value in the slot 404 with the generated data.

Figure 4F:
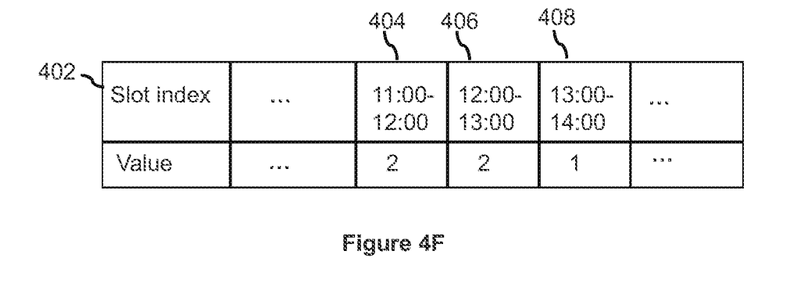

At 13:02, the data value of the slot 406 is matured for the near-real-time processing module 306, and the near-real-time processing module 306 may at this time update the data value with the data it generated based on events that occur between 12:00 and 13:00. As mentioned above, the data generated by the real-time processing module 304 may be inaccurate due to a variety of reasons. For example, event data associated with an event may be dropped, due to the fact that the event data has expired for the real-time processing module 304 by the time that the real-time processing module 304 begins to process the event data. FIG. 4F illustrates another example snapshot of the daily bucket 402 at 13:02, before the near-real-time processing module 306 updates the data value for the slot 406. As shown, the data value in the slot 406 is inaccurate (showing a data value of '2' when three login attempts have occurred within the hour of 12:00 to 13:00), which may be caused by the real-time processing module 304 failing to process one of the events that occurred between 12:00 and 13:00. At this time, the near-real-time processing module 306 may update the data value of the slot 406 to '3,' for example, via the data recovery messaging bus 312. Although not shown here, the near-real-time processing module 306 may also update the corresponding slots in the other data buckets (e.g., the hourly bucket and the yearly bucket) when the corresponding data values are matured.

It has been contemplated that while the near-real-time processing module 306 may produce data records that are more accurate (e.g., of higher quality) than the data records produced by the real-time processing module 304, it might not be completely accurate still, due to the time constraint and/or other reasons. As such, the event data may also be distributed to an offline batch processing module 308 for processing under a third time constraint (in block 220 of FIG. 2). The third time constraint is longer (e.g., more relaxed) than the first time constraint and the second time constraint. For example, the third time constraint may be in days (e.g., 2 days, 5 days, etc.). Furthermore, the event data related to events that occurred within a time period (e.g., within several hours, within a day, etc.) may be compiled in a batch before being distributed to and then processed by the offline batch processing module 308. According to various embodiments of the disclosure, the operation(s) performed by the offline batch processing module 308 may be substantially identical to the operation(s) performed by the near-real-time processing module 306 and the operation(s) performed by the real-time processing module 304. The offline batch processing module 308 may run offline, and in a process that is separate from the real-time processing module 304 and the near-real-time processing module 306. One of the advantages of the offline batch processing module 308 running offline separate from the other online processing modules 304 and 306 is that in the event the online data processing portion of the data processing module 104 crashes, the offline batch processing module 308 may still recover the data by processing the event data offline.

Similar to the near-real-time processing module 306, the offline batch processing module 308 may process the event data to generate data values for the corresponding data record, and update (e.g., overwrite) the data record with the generated data values, for example, via the data recovery messaging bus 312. In some embodiments, the offline batch processing module 308 may update the data value of a slot in a data bucket when the data value is matured for the offline batch processing module 308 (that is, when the data value is no longer updatable by the near-real-time processing module 306 because the corresponding time frame of the slot is beyond the second time constraint with respect to the current time). For example, if the second time constraint associated with the near-real-time processing module 306 is five minutes, then the data value of a slot is matured for the offline batch processing module 308 five minutes after the slot is expired (i.e., when the current time is five minutes after the corresponding time interval of the slot has ended). Referring back to the daily bucket 402, the data value in the slot 404 is matured for the offline batch processing module 308 five minutes after 12:00 on a given day. The resulting data record after updated (e.g., overwritten) by the near-real-time processing module 306 and the offline batch processing module 308 has more accurate data (e.g., of higher quality) than the data record prepared by only the real-time processing module 304. While only the generation and correction of data values for the data record associated with login attempts are illustrated in the example given above, similar processes may be applied to generate and/or correct data values for other data records (e.g., payment transactions data records, login attempts of other user accounts) as well to achieve the same benefits. The data records may then be accessible and/or consumed by other applications such as the service processing app 108. Furthermore, the data processing module 104 according to various embodiments of the disclosure may generate a summary data value for the data record by combining the data values in the slots of the buckets before providing the summary data value to the data consumers. For example, the data processing module 104, based on a request by the data consumer, may compute a total login attempts number within an hour, within a day, within a year, etc. based on the data values stored in the slots of the buckets. The summary data value may be dynamically generated based on the updated data values in the slots of the buckets, such that while a less-than-accurate summary data value may be generated at a given time, a more accurate summary data value may be generated at a later time after the data values in the slots of the buckets are updated (e.g., corrected) by the near-real-time processing module 306 and/or the offline batch processing module 308.

Figure 5:
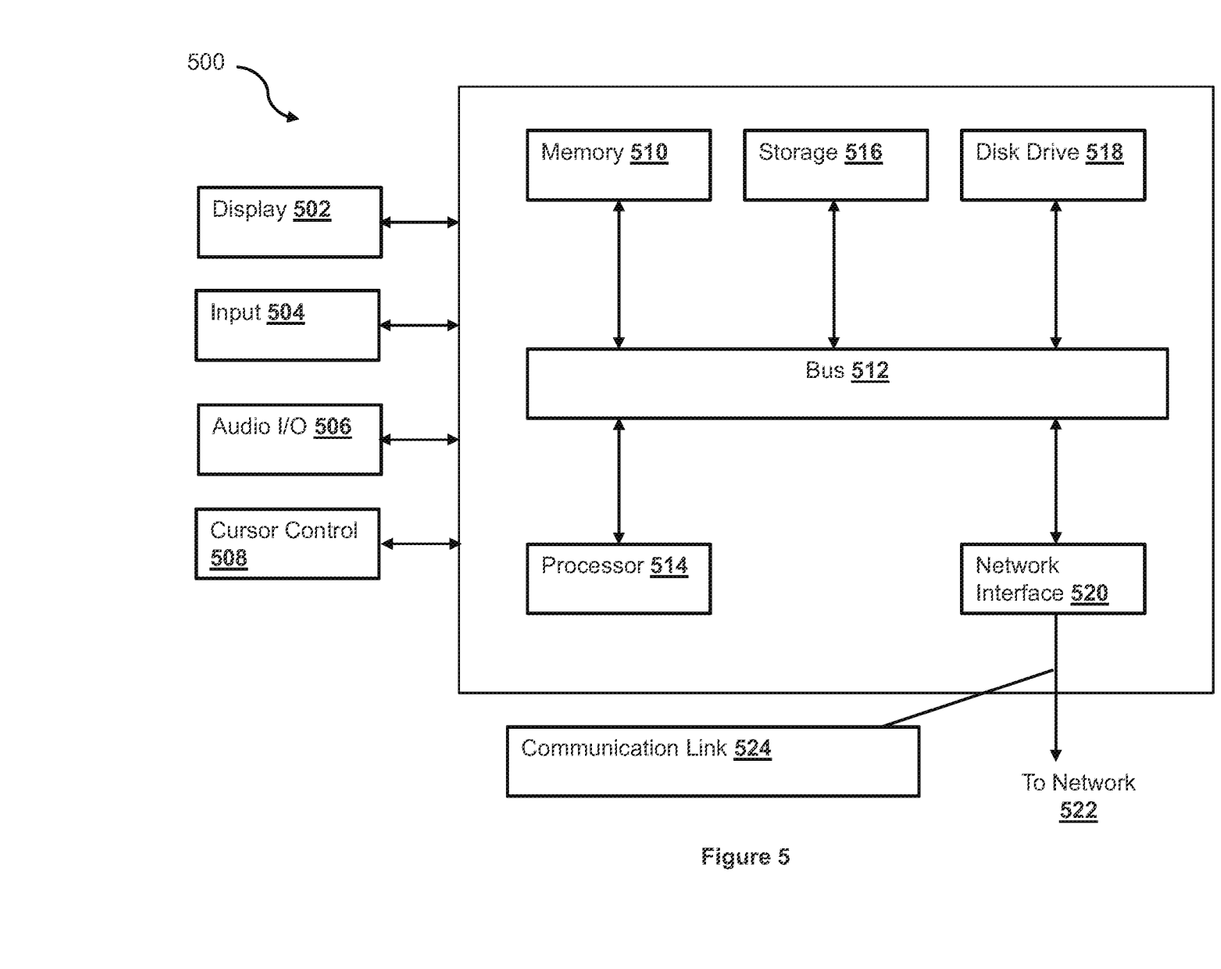
FIG. 5 is a block diagram of a system for implementing a device according to an embodiment of the present disclosure.

FIG. 5 is a block diagram of a computer system 500 suitable for implementing one or more embodiments of the present disclosure, including the user device 112, the merchant server 122, and the service provider server 102. In various implementations, the user device 112 may include a mobile cellular phone, personal computer (PC), laptop, wearable computing device, etc. adapted for wireless communication, and each of the merchant server 122 and the service provider server 102 may include a network computing device, such as a server. Thus, it should be appreciated that the devices 112, 122, and 102 may be implemented as computer system 500 in a manner as follows.

Computer system 500 includes a bus 512 or other communication mechanism for communicating information data, signals, and information between various components of computer system 500. Components include an input/output (I/O) component 504 that processes a user (i.e., sender, recipient, service provider) action, such as selecting keys from a keypad/keyboard, selecting one or more buttons or links, etc., and sends a corresponding signal to bus 512. I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant associated with the merchant server 122. An optional audio input/output component 506 may also be included to allow a user to use voice for inputting information by converting audio signals. Audio I/O component 506 may allow the user to hear audio. A transceiver or network interface 520 transmits and receives signals between computer system 500 and other devices, such as another user device, a merchant server, or a service provider server via network 522. In one embodiment, the transmission is wireless, although other transmission mediums and methods may also be suitable. A processor 514, which can be a microcontroller, digital signal processor (DSP), or other processing component, processes these various signals, such as for display on computer system 500 or transmission to other devices via a communication link 524. Processor 514 may also control transmission of information, such as cookies or IP addresses, to other devices.

Components of computer system 500 also include a system memory component 510 (e.g., RAM), a static storage component 516 (e.g., ROM), and/or a disk drive 518 (e.g., a solid state drive, a hard drive). Computer system 500 performs specific operations by processor 514 and other components by executing one or more sequences of instructions contained in system memory component 510. For example, processor 514 can receive purchase requests from a merchant, process the purchase requests, assess a user's purchase profile, increase a user's conversion rate, identify digital wallets of a user, determine which digital wallets are most applicable to a user and should be recommended, and provide merchants with the recommended digital wallets. Logic may be encoded in a computer readable medium, which may refer to any medium that participates in providing instructions to processor 514 for execution. Such a medium may take many forms, including but not limited to, non-volatile media, volatile media, and transmission media. In various implementations, non-volatile media includes optical or magnetic disks, volatile media includes dynamic memory, such as system memory component 510, and transmission media includes coaxial cables, copper wire, and fiber optics, including wires that comprise bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

In view of the present disclosure, it will be appreciated that various methods and systems have been described according to one or more embodiments for facilitating a digital wallet transaction.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled to the non-transitory memory and configured to read instructions from the non-transitory memory to cause the system to perform operations comprising:
   receiving a transaction request for processing one or more transactional actions related to a user account based on a set of transaction data;
   processing, by a first processing module, the transaction request based on the set of transaction data under a first time constraint that indicates a first instance of time to abort the processing of the transaction request by the first processing module, wherein the processing the transaction request under the first time constraint comprises generating a first value for a temporary data record associated with the user account based on the set of transaction data;
   updating the temporary data record associated with the user account based on the first value;
   processing, by a second processing module different from the first processing module, the transaction request based on the set of transaction data under a second time constraint that indicates a second instance of time to abort the processing of the transaction request by the second processing module, wherein the second instance of time is later than the first instance of time, and wherein the processing the transaction request under the second time constraint comprises generating a second value for the temporary data record associated with the user account based on the set of transaction data;

determining, by the second processing module, that a correction to the temporary data record is required based on a difference between the first value and the second value;

determining, by the second processing module, that the first processing module is permitted to edit the temporary data record based on the first instance of time indicated by the first time constraint;

in response to determining that the first processing module is permitted to edit the temporary data record, suspending, by the second processing module, the correction to the temporary data record based on the second value;

subsequent to the suspending, determining, by the second processing module, that the first processing module is no longer permitted to edit the temporary data record based on the first instance of time indicated by the first time constraint; and in response to determining that the first processing module is no longer permitted to edit the temporary data record, resuming, by the second processing module, the correction to the temporary data record, wherein the resuming the correction comprises changing a value in the temporary record using the second value.

2. The system of claim 1, wherein the updating the temporary data record comprises changing a data value in the temporary data record using the first value.

3. The system of claim 1, wherein the transaction request is associated with a timestamp representing a time at which the transaction request is received, and wherein the operations further comprise:

determining the first instance of time based on the timestamp and the first time constraint, wherein the updating the temporary data record is in response to a determination that the first instance of time has not passed.

4. The system of claim 1, wherein the operations further comprise accessing the first value stored in the updated temporary data record, wherein the determining that the correction to the temporary data record is required is further based on comparing the second value against the first value accessed from the updated temporary data record.

5. The system of claim 1, wherein the operations further comprise:

determining, from a plurality of temporary data records associated with the user account, the temporary data record for updating based on a timestamp indicated in the transaction request.

6. The system of claim 1, wherein the operations further comprise:

disregarding, by the first processing module, at least a portion of the transaction request that has not been processed when the processing of the transaction request by the first processing module is aborted.

7. The system of claim 1, wherein the determining that the first processing module is no longer permitted to edit the temporary data record comprises:

determining that the first instance of time has passed.

8. The system of claim 1, wherein the operations further comprise subsequent to resuming the correction to the temporary data record, updating a permanent data record associated with the user account based on a data value in the temporary data record.

9. The system of claim 1, wherein the operations further comprise:

processing by a third processing module, the transaction request under a third time constraint, wherein the third time constraint indicates a third instance of time that is later than the second instance of time, and wherein the processing the transaction request under the third time constraint comprises generating a third value for the temporary data record; and in response to determining that the second processing module is no longer permitted to edit the temporary data record based on the second time constraint, correcting, by the third processing module, the temporary data record based on the third value.

10. The system of claim 9, wherein the first processing module is configured to process the transaction request in an online environment, and wherein the third processing module is configured to process the transaction request in an offline environment.

11. The system of claim 1, wherein the one or more transaction actions comprise at least one of a login transaction or a purchase transaction.

12. A method, comprising:

receiving, by one or more hardware processors associated with a data processing system, event data associated with one or more events related to a user account;

processing, by a first processing module of the data processing system, the event data under a first time constraint that indicates a first expiration time to abort the processing of the event data by the first processing module, wherein the processing the event data under the first time constraint comprises generating a first value for a temporary data record associated with the user account based on the event data;

updating, by the first processing module, the temporary data record associated with the user account based on the first value;

processing, by a second processing module of the data processing system different from the first processing module, the event data under a second time constraint that indicates a second expiration time to abort the processing of the event data by the second processing module, wherein the second expiration time is later than the first expiration time, and wherein the processing the event data under the second time constraint comprises generating a second value for the temporary data record associated with the user account based on the event data;

determining, by the second processing module, that a correction to the temporary data record is required based on a difference between the first value and the second value;

in response to determining that the temporary data record is editable by the first processing module based on the first time constraint, suspending, by the second processing module, the correction to the temporary data record based on the second value; and subsequent to the suspending and in response to determining that the temporary data record is no longer editable by the first processing based on the first time constraint, resuming, by the second processing module, the correction to the temporary data record, wherein the resuming the correction comprises changing a value in the temporary data record using the second value.

13. The method of claim 12, wherein the event data of the one or more events comprises a timestamp representing a time at which the one or more events occurred.

14. The method of claim 13, wherein the temporary data record comprises a plurality of data value slots corresponding to different time intervals, and wherein the updating the temporary data record comprises:

determining, from the plurality of data value slots, a first data value slot corresponding to the one or more events based on the timestamp of the one or more events; and updating the first data value slot based on the first value.

15. The method of claim 12, wherein the processing the event data further comprises:

disregarding, by the first processing module, at least a portion of the event data that has not been processed when the processing of the event data by the first processing module is aborted.

16. The method of claim 12, wherein the temporary data record comprises a plurality of data value slots corresponding to different time intervals, and wherein the resuming the correction to the temporary data record comprises:

determining, from the plurality of data value slots, a first data value slot corresponding to the one or more events based on a timestamp of the one or more events; and updating the first data value slot based on the second value.

17. A non-transitory machine-readable medium having stored thereon machine-readable instructions executable to cause a machine to perform operations comprising:

receiving event data associated with one or more events related to a user account;

processing, by a first processing module, the event data under a first time constraint that indicates a first maturation time to abort the processing of the event data by the first processing module, wherein the processing the event data under the first time constraint comprises generating a first value for a temporary data record associated with the user account based on the event data;

updating, by the first processing module, the temporary data record associated with the user account based on the first value;

processing, by a second processing module different from the first processing module, the event data under a second time constraint that indicates a second maturation time to abort the processing of the event data by the second processing module, wherein the second time constraint is longer than the first time constraint, and wherein the processing the event data under the second time constraint comprises generating a second value for the temporary data record associated with the user account based on the event data;

determining, by the second processing module, that a correction to the temporary data record is required based on a difference between the first value and the second value;

determining, by the second processing module, that the temporary data record is updatable by the first processing module based on the first time constraint;

in response to determining that the temporary data record is updatable by the first processing module, suspending, by the second processing module, the correction to the temporary data record based on the second value; and subsequent to the suspending and in response to determining that the temporary data record is no longer updatable by the first processing module based on the first time constraint, resuming, by the second processing module, the correction to the temporary data record, wherein the resuming the correction comprises changing a value in the temporary data record using the second value.

18. The non-transitory machine-readable medium of claim 17, wherein the operations further comprise updating a permanent data record associated with the user account based on a data value in the temporary data record.

19. The non-transitory machine-readable medium of claim 17, wherein the event data of the one or more events comprises a timestamp representing a time at which the one or more events occurred, and wherein the temporary data record comprises a plurality of data value slots corresponding to different time intervals.

20. The non-transitory machine-readable medium of claim 19, wherein the updating the temporary data record comprises:

determining, from the plurality of data value slots, a first data value slot corresponding to the one or more events based on the timestamp of the one or more events; and updating the first data value slot based on the first value.

* * * * *